United States Patent [19]

Swisher et al.

[11] Patent Number: 5,134,838
[45] Date of Patent: Aug. 4, 1992

[54] MOWER PICK-UP BROOM

[75] Inventors: Max B. Swisher, Warrensburg, Mo.; David Burnham, Rosehill, Kans.

[73] Assignee: Swisher Mower and Machine Co., Inc., Warrensburg, Mo.

[21] Appl. No.: 559,156

[22] Filed: Jul. 20, 1990

[51] Int. Cl.⁵ .................. A01D 34/70; A01D 87/08
[52] U.S. Cl. .......................... 56/16.6; 15/83; 15/183; 56/11.8; 56/14.4; 56/364; 56/DIG. 12
[58] Field of Search .......... 56/16.6, 14.4, 14.3, 56/364, DIG. 12, 194, 17.5, 16.7, 11.8; 15/83, 82, 183, 179

[56] References Cited

U.S. PATENT DOCUMENTS

| | | | |
|---|---|---|---|
| 2,964,896 | 12/1960 | Finocchiaro | 56/364 X |
| 3,183,653 | 5/1965 | Cromwell | 56/364 X |
| 3,225,389 | 12/1965 | Jones | 15/183 X |
| 3,241,172 | 3/1966 | Tilgner | 15/183 |
| 3,493,987 | 2/1970 | Longnecker | 15/83 |
| 3,591,883 | 7/1971 | Armstrong et al. | 15/83 X |
| 3,713,284 | 1/1973 | Dankel et al. | 15/83 X |
| 3,984,967 | 10/1976 | Jones | 56/11.8 |
| 4,058,957 | 11/1977 | Roseberry | 56/11.8 X |
| 4,777,786 | 10/1988 | Arnold | 56/16.6 X |
| 4,796,322 | 1/1989 | Steed et al. | 56/16.6 X |

FOREIGN PATENT DOCUMENTS

| | | | |
|---|---|---|---|
| 2032488 | 1/1972 | Fed. Rep. of Germany | 15/83 |
| 1352797 | 1/1964 | France | 15/183 |

Primary Examiner—Hoang C. Dang
Attorney, Agent, or Firm—Litman, McMahon & Brown

[57] ABSTRACT

A grass pick-up broom for riding, walk-behind and tow-behind mowers includes a cylindrical sleeve rotatably mounted on a rear axle of a mower and having spaced elongate brushes fixedly attached to the sleeve and extending radially therefrom. The sleeve is connected by a belt to a rotary cutting blade powered by an engine mounted on the mower. When the cutting blade is engaged, the sleeve automatically rotates about the axle causing the brushes to rotate thereabout, propelling grass clippings and other debris into a grass catcher located behind the broom. The brushes of the broom also comb the surface of the newly cut grass, picking up grass clippings and other heavier debris and transfering the debris to the grass catcher.

14 Claims, 2 Drawing Sheets

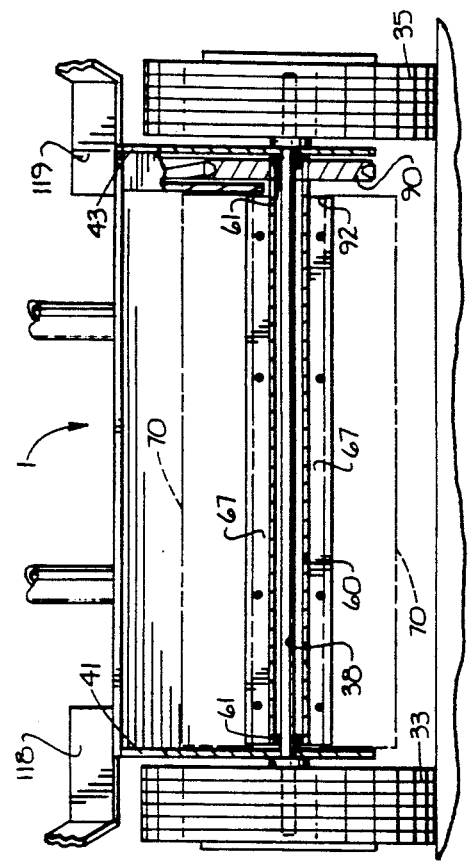
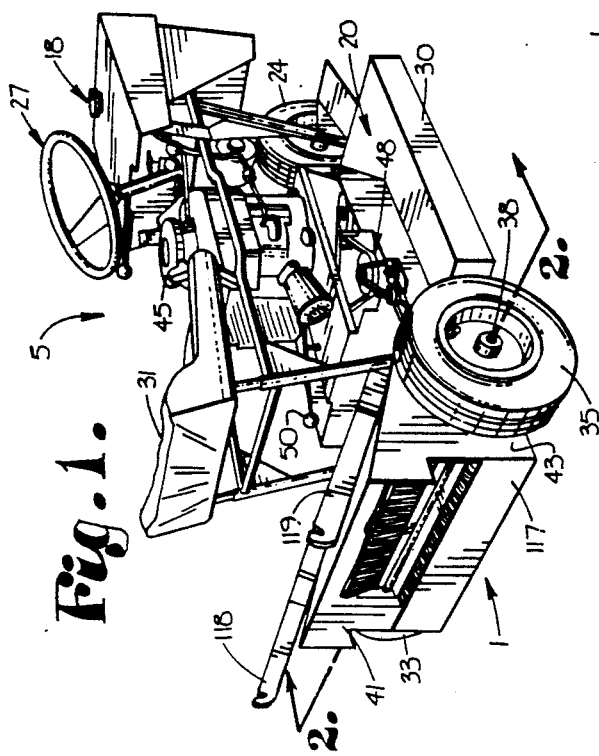
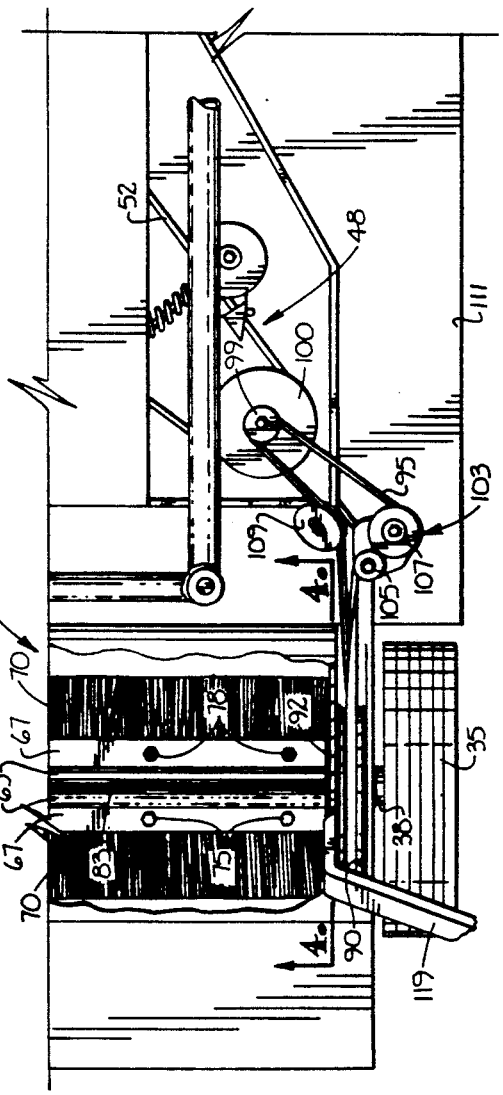

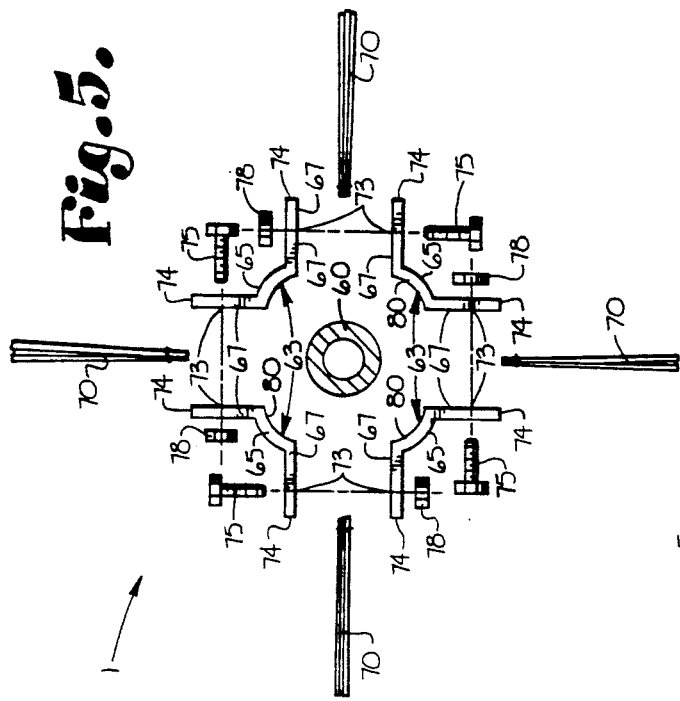
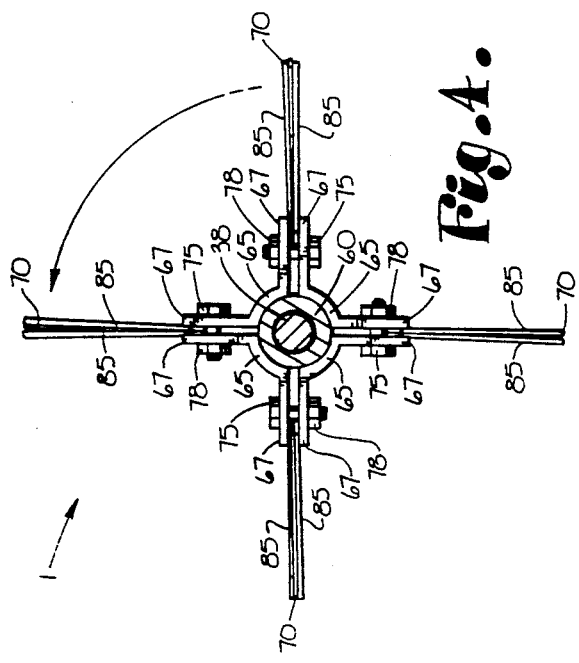
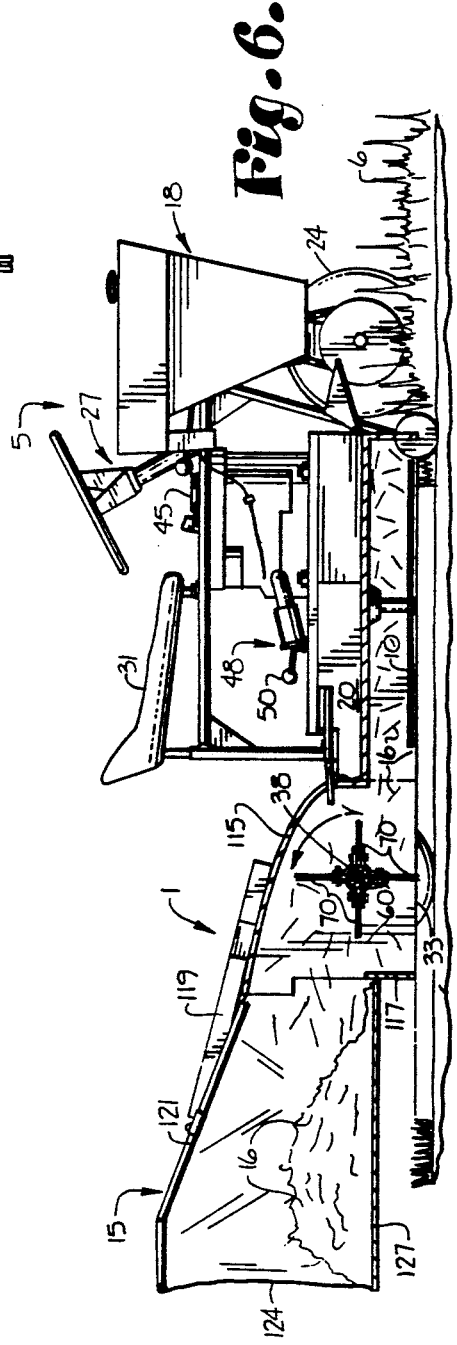

MOWER PICK-UP BROOM

BACKGROUND OF THE INVENTION

The present invention relates to mowers and more particularly to an improved grass clippings pick-up broom assembly mounted on a mower and adapted to transfer grass clippings and other debris into a rear mounted grass catcher.

Motor powered rotary mowers typically include attachments for catching grass clippings and other debris. Walk-behind, riding and tow-behind mowers are often adapted for either side or rear discharge of debris, and include mower decks and rotary blades that are contoured such that debris is propelled out a side or rear discharge chute and into an attached grass catcher. Mowers may include a variety of vacuum systems for creating partial vacuums under the mower decks to pull clippings and other debris into grass catchers.

If a mower and grass catcher assembly does not include a special vacuum system for drawing the clippings and other debris into a grass catcher, some of the clippings and the heavier debris are often left on the ground. Small walk-behind and riding mowers typically do not include special vacuum systems because of the weight and expense of such systems. Such systems also add undesirable expense to larger riding and tow-behind mowers.

A separate lawn sweeper may be used to pick up debris left behind by a rotary mower. Lawn sweepers are available that utilize a rotating sweeping action to pick up debris, such as leaves, and can include bristles that come in contact with the leaves and lift them into a bag or other container attached to the sweeper. There are several disadvantages to such sweepers when they are utilized for picking up grass clippings: additional time and labor are required for an operator to make two passes over a lawn, first with a mower and then with the sweeper; the added expense of purchase and maintenance of two lawn keeping devices; after the mowing operation is completed, grass clippings can settle into the grass, requiring a sweeper that brushes deeply into the grass to remove the debris, resulting in lawn damage if the grass is brushed too harshly; the brushes of the sweeper may not be dense enough (i.e. have enough bristles) to pick up small grass clippings as compared to leaves; and such a sweeper which uses physical force to transfer the debris may not create a vacuum sufficient to draw light and/or small debris into a catcher.

SUMMARY OF THE INVENTION

A grass pick-up broom assembly of the invention disclosed in this application is rotatably mounted on a rear wheel axle of a riding, walk-behind or tow-behind mower and located between the mower blade or blades that are mounted beneath the mower deck and a grass catcher that is mounted at the rear of the mower. The pick-up broom assembly physically lifts clippings and heavier debris from the ground and also propels light debris into the grass catcher.

The pick-up broom assembly includes a cylindrical sleeve rotatably mounted on the axle and extending generally between the two rear wheels of the mower. Four brushes are fixedly attached to the sleeve. Each brush is made from a plurality of nylon bristles with each bristle projecting radially from the cylindrical sleeve. Each brush extends along the length of the sleeve. When the assembly is viewed cross-sectionally, each brush is narrow in width and located at a ninety degree angle from the brush adjacent thereto.

The cylindrical sleeve is connected by a belt to a belt drive located on the mower deck that rotates the mower blade or blades. The belt drive is in turn driven by the mower engine. Therefore, whenever the belt drive is engaged and the mower blade or blades are rotating, the cylindrical sleeve of the broom assembly is also turning, rotating the brushes in a direction backwards to the direction of rotation of the mower wheels. The rotating brushes draw clippings from underneath the mower deck and propel them to a grass catcher attached to the rear end of the mower. The ends of the brushes also comb the grass, lifting clippings and heavier debris from the ground surface up into the grass catcher and producing a lawn with a buffed, manicured finish.

OBJECTS OF THE INVENTION

Therefore, the objects of the present invention are: to provide an improved grass clipping and debris pick-up assembly that is adapted to cooperate with riding, walk-behind and tow-behind mowers; to provide such an assembly that works in cooperation with a rotary blade or blades of a mower to propel grass clippings and other debris into a grass catcher; to further provide such an assembly that generally combs the grass, lifting clippings and heavier debris from the ground into a grass catcher; to provide such an assembly that utilizes a rotating sweeping action to pick up cuttings and other debris; to provide such an assembly that is rotatably mounted on a rear wheel axle of a mower and includes brushes that rotate about the axle; to provide such an assembly wherein the brushes rotate in a direction counter to the direction of rotation of the mower wheels; to provide such an assembly that includes brushes that extend generally between the wheels of the rear axle; to provide such an assembly that may be adapted to various sizes of mowers and various cutting widths; to provide such an assembly that is driven in cooperation with a mower blade drive with the brushes rotating automatically when the mower blade is rotating; to provide such an assembly that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a grass clippings pick-up broom according to the present invention shown with a riding lawn mower.

FIG. 2 is an enlarged and fragmentary cross-sectional view of the pick-up broom and mower taken along 2—2 of FIG. 1.

FIG. 3 is an enlarged and fragmentary top plan view of the pick-up broom and mower.

FIG. 4 is an enlarged and fragmentary cross-sectional view of the pick-up broom taken along 4—4 of FIG. 3.

FIG. 5 is an exploded view of the cross-section of the pick-up broom shown in FIG. 4.

FIG. 6 is a partially schematic side elevational view of the pick-up broom and mower shown with a grass catcher.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in detail, debris pick-up means of this invention, such as a pick-up broom assembly, generally designated by the reference numeral 1 is mounted on a riding lawn mower 5 utilized for mowing grass 6. The pick-up broom assembly 1 is located generally between mowing means such as rotary cutting blade 10 and a debris catching means such as grass catcher 15 for the deposit of grass clippings and other debris 16. Although not shown in the drawings, the broom assembly 1 may also be mounted on other types of mowers including walk-behind and tow-behind mowers.

The mower 5 generally includes a front frame section 18 fixedly connected to a lower frame or deck 20. The front section 18 is mounted on a front wheel 24 cooperating with a steering wheel assembly 27 also mounted on the front frame section 18. The rotary cutting blade 10 is slidably mounted to the bottom of the lower frame 20 and is protected by a blade housing 30 fixedly attached to the lower frame 20. An operator seat 31 is also mounted on lower frame 10.

Rear wheel means, such as illustrated by rear wheels 33 and 35 mounted on axle 38, is located behind the lower frame 20. Axle 38 is slidably mounted on rear side frame members 41 and 43 located near wheels 33 and 35 respectively. Frame members 41 and 43 are fixedly attached to lower frame 20.

The mower 5 is powered by a prime mover or power means, such as engine 45 mounted on frame 20 and connected to at least one of the front and rear wheels 24, 33 and 35. Mower blade powering means such as a rotary cutting blade belt drive assembly 48 is connected to cutting blade 10 and mounted on frame 20. The belt drive assembly 48 includes an operator control lever 50 for operatively connecting the assembly 48 with the engine 45 to rotate blade 10. When an operator (not shown), moves lever 50, assembly 48 is engaged, putting a belt 52 of the assembly 48 into motion that in turn rotates the cutting blade 10.

The pick-up broom assembly 1, shown in detail in FIGS. 2, 3, 4 and 5, includes a cylindrical sleeve 60 rotatably mounted on axle 38 and extending generally between side frame members 41 and 43. Axle 38 is journaled by bearings 61 located near opposite ends of sleeve 60. When the broom assembly 1 is utilized with a walk-behind or tow-behind mower, the cylindrical sleeve portion of the broom assembly is similarly slidingly mounted on a rear wheel axle. Therefore, in several embodiments of this invention, the rear axle is dual purpose.

Four brush attachment members 63, each having a curved section 65 located between two straight sections 67 attach to the sleeve 60 and hold four elongate brushes 70 in place. The brush attachment members 63 are generally elongate, extending along the length of the cylindrical sleeve 60. Each straight section 67 includes a plurality of apertures 73 spaced along the length thereof that are centrally located between the curved section 65 and an end 74 of the straight section 67. Bolts 75 pass through apertures 73 fixedly attaching two straight sections 67 together and each are secured with a nut 78. All four brush attachment members 63 are thus fixedly connected by bolts 75. An inner surface 80 of each curved section 65 is adapted to mate with the outer surface of cylindrical sleeve 60. When all four brush attachment members 63 are fastened together, the inner surface 80 of each member 63 is fixedly attached by friction to the cylindrical sleeve 60 and each of the straight sections 67 project radially from the sleeve 60.

As shown in FIG. 4, each brush 70 is secured by friction between two straight sections 67 along the length thereof and at a location between the bolts 75 and ends 74. The bolts 75 and nuts 78 force the straight sections 67 together, keeping the brushes 70 firmly trapped therebetween. Each brush 70 projects radially from the cylindrical sleeve 60 an extends along the length of the sleeve 60 generally between side frame members 41 and 43.

Each brush 70 is generally narrow in width and is made from a plurality of bristles 83 made from nylon or the like. The narrow width of each brush 70 is necessary to allow space between the brushes 70 for accumulation of debris 16 therebetween, particularly heavier debris such as sticks that tend to lay on the outer side surface 85 of the brushes during transfer into the grass catcher 15. It is forseen that fewer or greater numbers of brushes 70 may be utilized for the present invention. As few as two brushes may be sufficient for use with a small walk-behind mower. More than four brushes may be required for a larger mower having an axle located higher from the ground than axle 38 and therefore requiring brushes 70 that project a longer distance from the sleeve 60.

The bristles 83 of each brush 70 ar of medium firmness. If the bristles 83 are too soft, each brush 70 is not strong enough to lift heavier debris such as small sticks and wet leaves. On the other hand, if the bristles are too stiff, the brushes 70 will hit the ground forcefully and bruise or destroy grass 6 growing thereon.

Factors contributing to the stiffness of the brushes 70 include the diameter of the bristles and the density of the brush. For example, a brush 70 utilized for this invention includes bristles 83 made from nylon, each bristle 83 having a diameter of approximately 0.0030 inches. Each brush 70 also contains approximately sixty to eighty bristles for each one inch length of the brush 70. The length of each bristle 83 is approximately three to three and one/half inches. The bristles 83 must be long enough to moderately comb into the grass 6 recently trimmed by the mower 5. It is forseen that with larger or smaller mowers, different lengths and thicknesses of bristles and different densities of brushes will be required to produce the desired result of combing the grass 6 for clippings and other debris 16 without damaging the grass. The combing action of the brushes 70 also result in a lawn with a buffed or manicured like finish similar to an athletic field.

As shown in FIGS. 2 and 3, the broom assembly 1 is connected to the rotary cutting blade belt drive assembly 48. A circular belt sheeve 90 positioned generally vertically is fixedly mounted on the cylindrical sleeve 60 and located between the side frame member 43 and an edge 92 of the brush attachment members 63 and brushes 70. A belt 95 is in contact with and loops about belt sheeve 90 and is also in contact with and loops about a small belt sheeve 99 which is fixedly connected to a pulley 100 located on the belt drive assembly 48 which operates the cutting blade 10. Sheeve 90 and small belt sheeve 99 are sized to provide a speed of broom assembly rotation that is proportional to the ground speed of the mower for effective debris pickup. A rapidly revolving broom assembly 1 creates a vacuum underneath frame 20 within blade housing 30, drawing grass clippings and other debris 16 from beneath the frame 20 into the broom assembly 1.

The belt 95 courses through a pulley assembly 103 that is mounted on frame 20 and located between the belt sheeve 90 and pulley 100. The pulley assembly 103 changes the belt orientation from a generally vertical position near sheeve 90 to a generally horizontal orientation near pulley 100. The pulley assembly 103 also protects the belt 95 from wear and provides safe operation thereof.

The pulley assembly 103 includes three idler pulleys 105, 107 and 109. Each pulley 105, 107 and 109 is freely rotatable about a central axis perpendicular thereto. Pulleys 105 and 107 are positioned generally horizontally and are adjacent to each other. Idler pulley 105 is located between sheeve 90 and pulley 107. Belt 95 is in contact with idler pulley 105 and pulley 105 guides belt 95 to pulley 107. Idler pulley 107 is in contact with belt 95 and guides belt 95 horizontally in a lateral direction towards an outer edge 111 of frame 20 to provide space for the belt 95 to loop around the small sheeve 99. Idler pulley 109 is positioned at an approximate forty-five degree angle with respect to the horizontal with belt 95 in contact with the upper portion of the pulley 109.

It is foreseen that other apparatus may be utilized to connect the broom assembly 1 with the drive assembly 48 for the cutting blade 10. The pulley assembly 103 may also be utilized with other types or configurations of cutting blade drive assemblies. It is also forseen that the broom assembly 1 may be powered directly from the engine 45.

The broom assembly 1 includes a top guard member 115 fixedly attached to frame 20 and to side frame members 41 and 43. A rear support member 117 is connected to side frame members 41 and 43 and is located to the rear of broom assembly 1. Grass catcher attachment members 118 and 119 are fixedly attached to the top guard member 115 and extend rearwardly therefrom.

The detachable grass catcher 15 is shown in FIG. 6 with an upper support rail 121 connected to the attachment member 119. Support rail 121 extends around the top of the grass catcher 15 and also connects (not shown) with the attachment member 118. The grass catcher 15 includes three side walls 124 fixedly attached to support rail 121 and to a base 127 that abuts the rear support member 117 ensuring that debris 16 propelled into the broom assembly 1 is transferred into the grass catcher 15. It is forseen that other grass catcher configurations may be used with the broom assembly 1 of this invention.

In operation, the mower 5 is set in motion by an operator (not shown) sitting in seat 31. The operator moves lever 50 to start rotation of the cutting blade 10. When lever 50 is moved, belt 52 is set in motion, rotating blade 10. Belt 52 also rotates pulley 100, rotating small sheeve 99 fixedly attached thereto. The rotation of sheeve 99 sets belt 95 in motion, thereby rotating sheeve 90 and pick-up broom assembly 1 fixedly attached thereto. The broom assembly 1 rotates in a direction counter-clockwise as viewed from the side elevation shown in FIG. 6. As the brushes 70 of the broom assembly 1 rotate, a partial vacuum is created underneath frame 20 and grass clippings 16 recently produced by blade 10 are drawn into the broom assembly 1. The brushes 70 of the broom assembly 1 also comb the newly cut grass, lifting clippings and other heavier debris 16 from the ground. The rotating brushes 70 of the broom assembly 1 transfer debris 16 into a grass catcher 15 located behind the broom assembly 1. The combing action of brushes 70 also produce a buffed, manicured finish on the lawn surface.

It is to be understood that while certain forms of the present invention have been illustrated and described herein, it is not to be limited to the specific forms or arrangement of parts described and shown.

What is claimed and desired to be secured by Letters patent is as follows:

1. In a combination with a mower for use in cutting grass having a frame, mowing means mounted below said frame, power means engaging the mowing means, grass caching means, and wheel means connected to and supporting the frame, the improvement comprising:
    (a) debris pick-up means engaging the power means and rotatably mounted on the wheel means;
    (b) said mower having a direction of travel and said wheel means having a rotational axis extending generally transverse to said mower direction of travel; and
    (c) said debris pick-up means having a rotational axis coaxial with said wheel means rotational axis.

2. A mower, which comprises:
    (a) a frame;
    (b) a blade rotatably connected to said frame;
    (c) a prime mover mounted on said frame and drivingly connected to said blade;
    (d) a debris pick-up means rotatably mounted on said frame;
    (e) drive means selectively drivingly interconnecting said prime mower and said debris pick-up means;
    (f) wheel means mounted on and supporting said frame;
    (g) said mower having a direction of travel and said wheel means having a rotational axis extending generally transverse to said mower direction of travel; and
    (h) said debris pick-up means having a rotational axis coaxial with said wheel means rotational axis.

3. The mower according to claim 2, wherein:
    (a) said debris pick-up means is mounted on said wheel means.

4. In combination with a mower for use in cutting grass having a frame, mowing means mounted below said frame, power means engaging the mowing means, grass caching means, and wheel means connected to and supporting the frame, the improvement comprising:
    (a) debris pick-up means engaging the power means and rotatably mounted on the wheel means;
    (b) the wheel means including an axle; and
    (c) said debris pick-up means including a sleeve rotatably mounted on said axle; said sleeve including an elongate brush fixedly attached thereto and extending radially therefrom.

5. The mower according to claim 4, wherein:
(a) said debris pick-up means has a generally horizontal rotational axis.

6. A mower comprising:
(a) a frame;
(b) mowing means mounted below said frame;
(c) power means engaging said mowing means;
(d) a grass catcher connected to said frame;
(e) an axle mounted to said frame and located between said mowing means and said grass catcher;
(g) first and second wheels connected to said axle; and
(g) a debris pick-up broom rotatably mounted on said axle; said broom engages said power means.

7. The mower according to claim 6 wherein said mowing means includes:
(a) a rotary cutting blade rotatably mounted beneath said frame; and
(b) a belt drive assembly connecting said cutting blade to said power means.

8. The mower according to claim 7 wherein:
(a) said debris pick-up broom belt drive assembly; said pick-up broom is connected to said automatically rotating when said cutting blade rotates.

9. The mower according to claim 6 wherein said pick-up broom includes:
(a) a cylindrical sleeve rotatably mounted on said axle;
(b) an elongate brush fixedly attached to said sleeve and extending radially therefrom.

10. The mower according to claim 9 wherein:
(a) said elongate brush is made from a plurality of nylon bristles.

11. The mower according to claim 9 wherein said elongate brush is a first elongate brush and including:
(a) second, third and fourth elongate brushes each fixedly attached to said sleeve and extending radially therefrom; said first, second, third and fourth brushes generally equally spaced apart with said second and fourth brushes projecting from said sleeve at an angle of approximately ninety degrees from said first brush and said third brush.

12. A mower for cutting grass comprising:
(a) a frame;
(b) a rotary cutting blade rotatably mounted beneath said frame;
(c) an engine mounted on said frame;
(d) a belt drive assembly connecting said cutting blade to said engine;
(e) a grass catcher connected to said frame;
(f) an axle connected to said frame and located between said cutting blade and said grass catcher;
(g) first and second wheels connected to said axle;
(h) a cylindrical sleeve rotatably mounted on said axle;
(i) a plurality of spaced elongate brushes fixedly attached to said sleeve and extending radially therefrom; said brushes adapted to comb the grass when said sleeve is rotating; and
(j) a belt connected to said sleeve and connected to said belt drive assembly; said belt adapted to rotate said sleeve about said axle when said cutting blade rotates.

13. A mower, which comprises:
(a) a frame;
(b) a blade rotatably connected to said frame;
(c) a prime mover mounted on said frame and drivingly connected to said blade;
(d) a debris pick-up means rotatably mounted on said frame;
(e) drive means selectively drivingly interconnecting said prime mower and said debris pick-up means;
(f) wheel means being mounted on and supporting said frame and including an axle;
(g) said mower having a direction of travel; and
(h) said debris pick-up means having a generally horizontal rotational axis extending generally transversely to said direction of travel; said debris pick-up means including a sleeve rotatably mounted on said axle; said sleeve including an elongate brush fixedly attached thereto and extending radially therefrom for combing the grass surface.

14. A mower, which comprises:
(a) a frame;
(b) wheel means connected to and supporting said frame;
(c) a blade rotatably connected to said frame;
(d) a prime mover mounted on said frame and drivingly connected to said blade;
(e) a direction of travel;
(f) a debris pick-up means rotatably mounted on said frame and having a rotational axis extending generally transversely with respect to said mower direction of travel, said debris pick-up means including a rotating sleeve with brush bristles extending radially outwardly therefrom; and
(g) drive means selectively drivingly interconnecting said prime mower and said debris pick-up means, said drive means including:
 (1) a first pulley drivingly connected to said prime mover;
 (2) clutch means for selectively drivingly connecting said first pulley to said prime mover;
 (3) a small sheave fixedly and coaxially mounted on said first pulley for rotation therewith;
 (4) a second pulley mounted on said frame in spaced relation from said first pulley and having a vertical rotational axis;
 (5) a third pulley mounted on said frame in proximity to said second pulley and having a generally vertical rotational axis;
 (6) a fourth pulley mounted on said frame and having a rotational axis extending at an acute angle with respect to the horizontal;
 (7) a large sheave mounted on said debris pick-up means sleeve in coaxial alignment with the horizontal rotational axis thereof; and
 (8) a drive belt reeved on said sheaves and said second, third, and fourth pulleys, said drive belt drivingly interconnecting said sheaves in a power-magnifying, speed-reducing relationship for transmitting rotational force about a generally vertical rotational axis of said small sheave to said horizontal rotational axis of said debris pick-up means.

* * * * *